US005654084A

United States Patent [19]

Egert

[11] Patent Number: 5,654,084

[45] Date of Patent: Aug. 5, 1997

[54] PROTECTIVE COATINGS FOR SENSITIVE MATERIALS

[75] Inventor: Charles M. Egert, Oak Ridge, Tenn.

[73] Assignee: Martin Marietta Energy Systems, Inc., Oak Ridge, Tenn.

[21] Appl. No.: 278,836

[22] Filed: Jul. 22, 1994

[51] Int. Cl.$^{6}$ ........................................ B32B 7/02

[52] U.S. Cl. ........................ 428/215; 428/216; 428/332; 428/334; 428/422; 428/423.1; 428/446; 428/457; 428/458; 428/460; 428/461; 428/463; 428/474.4; 428/688; 428/689; 428/696; 428/697; 428/699; 428/701; 428/933

[58] Field of Search .............................. 428/422, 423.1, 428/446, 457, 458, 460, 461, 463, 474.4, 933, 688, 689, 696, 697, 699, 701, 213, 215, 216, 332, 334; 106/14.05, 14.34, 14.41

[56] References Cited

U.S. PATENT DOCUMENTS

| | | | |
|---|---|---|---|
| 4,341,841 | 7/1982 | Ohno et al. | 428/414 |
| 4,405,678 | 9/1983 | Downing et al. | 428/215 |
| 5,032,461 | 7/1991 | Shaw et al. | 428/461 |
| 5,037,478 | 8/1991 | Okai et al. | 106/479 |

*Primary Examiner*—D. S. Nakarani
*Attorney, Agent, or Firm*—Martin J. Skinner; J. Kenneth Davis

[57] ABSTRACT

An enhanced protective coating to prevent interaction between constituents of the environment and devices that can be damaged by those constituents. This coating is provided by applying a synergistic combination of diffusion barrier and physical barrier materials. These materials can be, for example, in the form of a plurality of layers of a diffusion barrier and a physical barrier, with these barrier layers being alternated. Further protection in certain instances is provided by including at least one layer of a getter material to actually react with one or more of the deleterious constituents. The coating is illustrated by using alternating layers of an organic coating (such as Parylene-C™) as the diffusion barrier, and a metal coating (such as aluminum) as the physical barrier. For best results there needs to be more than one of at least one of the constituent layers.

16 Claims, 3 Drawing Sheets

PROTECTIVE COATINGS FOR SENSITIVE MATERIALS

This invention was made with Government support under Contract DE-AC05-84OR21400 awarded by the United States Department of Energy to Martin Marietta Energy Systems, Inc. and the U.S. Government has certain rights in this invention.

TECHNICAL FIELD

The present invention relates to the production of protective coatings for sensitive materials, and more particularly to the preparation of multi-component coatings to prevent, or substantially reduce, interaction between components of the environment and such sensitive items. More specifically, the invention involves applying a synergistic combination of a diffusion barrier material and a physical barrier material, such as a plurality of alternating layers of both a diffusion barrier to slow any access to the item and a physical barrier to prevent access, the combination of these barriers providing a synergistic effect in protection.

BACKGROUND ART

In industry, there are numerous instances where a protective coating is utilized to reduce deleterious effects of the environment upon sensitive items. For example, various electronic apparatus is adversely affected by moisture that degrades insulation, initiates corrosion of parts, etc. Other devices are similarly damaged by vapors within the local environment, such as acid fumes, etc. Even in the medical field, constituents of the environment are often found to be detrimental due to various reactions.

It has been common practice in industry that, when the various items are potentially damaged by the environment, some form of coating is applied to reduce the potential interaction. Typically, various organic coatings are applied, one commonly-utilized coating being a parylene. Other similar organics (polymers and epoxys) are also utilized. Another form of protective coating utilized in industry is a metal or ceramic layer; typically, aluminum being the metal utilized.

Although these coatings have been generally satisfactory, long-term exposure to detrimental constituents often results in damaging of the coated item. This is particularly the case when the item is relatively easily attacked by corrosion, etc. The exact nature of the penetration of the coating by the damaging constituent is not always known; however, in the case of metal coatings, the metal tends to have pin-holes (possibly due to the columnar structure) in the layer due to the deposition techniques that are utilized for its application. Similarly, the organic layers are often penetrated by diffusion and/or small pin-holes.

Accordingly, it is an object of the present invention to provide a more impermeable coating for critical items to prevent penetration by deleterious components of the local atmosphere.

It is another object of the present invention to provide a coating for critical items, the coating deriving a synergistic result from a combination of diffusion barrier materials and physical barrier materials.

Another object of the present invention is to provide a coating for critical items, the coating deriving a synergistic result from alternating diffusion barrier layers and physical barrier layers.

A further object of the present invention is to provide a coating for critical items wherein the coating comprises multiple and alternating layers of an organic substance and a metal.

It is also an object of the present invention to provide a coating for critical items wherein the coating comprises multiple and alternating layers of a polymer and a ceramic.

Another object of the present invention is to provide a coating for critical items where the coating comprises multiple and alternating layers of a polymer and aluminum.

An additional object of the present invention is to provide a coating for critical items where a portion of the coating is a diffusion barrier material selected from polymers, carbon exhibiting properties equivalent to diamond amorphous carbon and silicon, together with a portion being a physical barrier material selected from metals and ceramics.

These and other objects of the present invention will become apparent upon a consideration of the following full description of the invention.

SUMMARY OF THE INVENTION

In accordance with the present invention, there is provided a coating for sensitive items to prevent interaction between potentially deleterious materials within the environment in which the sensitive item is stored and/or utilized. The coating of the invention is made up of a diffusion barrier material and a physical barrier material, such as in a plurality of layers, with these layers being alternating diffusion and physical barriers. Further, the coating layers can contain at least one getter, as in the form of a layer, to further retard movement of the deleterious material from the environment to the sensitive item. The diffusion barrier layer is typically provided by an organic material, such as a polymer, an epoxy or other carbon-containing materials. The physical barrier layer is typically provided by a metal or ceramic. The getter layer (if utilized) may be, typically, a reactive metal for "tying up" the deleterious constituent.

BEST MODE FOR CARRYING OUT THE INVENTION

Figure 1:
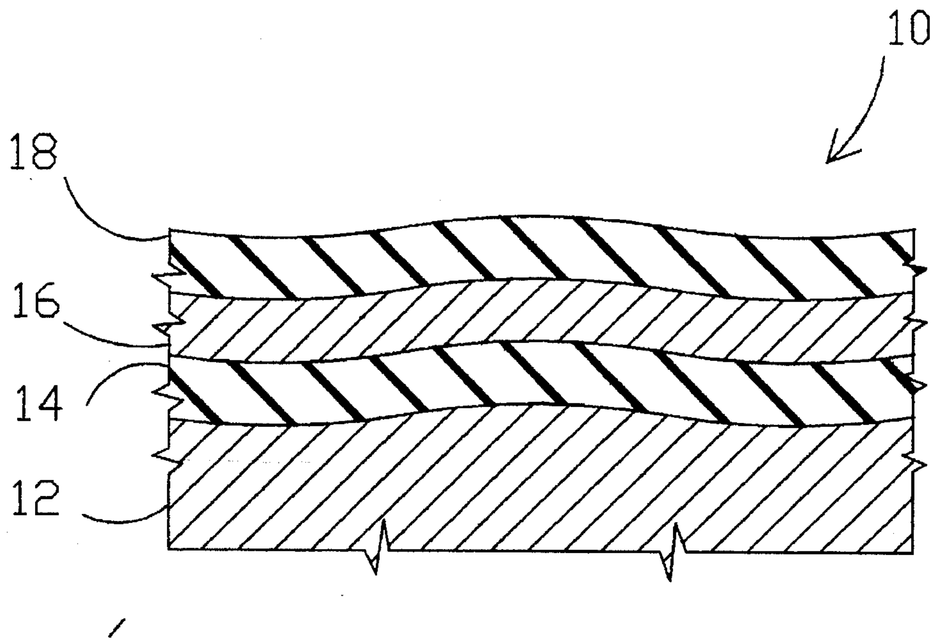
FIG. 1 is a cross-section of a coating according to the present invention with the layers significantly enlarged for purposes of illustration.

Referring now to FIG. 1, shown therein at 10 is one embodiment of the present invention. An object 12 that is to be protected, referred to hereinafter as a "substrate" is completely encased by an initial diffusion barrier layer 14. The substrate can be, for example, a piece of electrical equipment that is to be protected against corrosion. This diffusion barrier layer 14 typically is a polymer, such as poly(p-xylylene). Alternatively, it can be other parylenes, a polyamide, a fluropolymer, a polyethylene and various acrylate, silicones and urethanes. The diffusion layer 14 of this type can be applied by dipping, spraying, painting, vapor deposition, etc. so as to provide as complete, i.e., continuous, a layer as possible. The diffusion barrier must be a solid under conditions of utilization. Thus, the particular material must withstand the temperature and other conditions existing in the environment in which the coating is to be utilized. Although the example described hereinafter utilizes an organic layer as the diffusion layer, for elevated temperature applications this difffusion layer can be amorphous carbon, a carbon exhibiting properties similar to diamond, or silicon to provide a solid diffusion material at the temperature of operation.

Covering the diffusion barrier 14 is a physical barrier 16. This physical barrier is typically a metal such as applied by vapor deposition or plasma spraying. Such metals as aluminum, silicon, gold, molybdenum, etc., serve as this physical barrier to substantially reduce the quantity of a deleterious material reaching the diffusion barrier 14. Alternatively, this physical barrier 16 can be a ceramic. Typically, this could be silicon dioxide, silicon carbide, aluminum oxide, magnesium fluoride, etc.

Although the combination of the physical barrier 16 to the diffusion barrier 14 provides a reduction in permeation that is greater than a reduction by either of the layers alone, a further synergistic effect is achieved by applying a second diffusion layer 18 fully covering the physical barrier layer 16. This second diffusion layer 18 typically will have the same composition as that applied directly to the substrate 12. However, if different rejection characteristics are needed, it can have a different composition. Although the various layers are depicted as having substantially the same thickness, in practice this probably would not be the case. Rather, the diffusion barrier layers 14 and 18 typically would have a thickness of about twenty-five micrometers (e.g., twenty to thirty micrometers), a thickness easily achieved by the common methods for application. The physical barrier 16, also, typically would have a thickness of about twenty to thirty micrometers. It will be recognized, however, that other thickness can be utilized without departing from the scope of the present invention. For example, the individual layers can have a thickness of about 0.5 micrometers to about 100 micrometers, depending upon the particular application for protection. In the case of the physical barrier 16, probably the lower limit of thickness is about one to two micrometers in order to achieve an effective physical barrier.

A typical formation of a multi-layer coating can be achieved by the following sequence of operations.

1) Mount the object to be coated in a vacuum chamber and evacuate.
2) Open a valve to admit the organic parylene into the vacuum chamber and cause deposition of the organic by pyrolysis thereof to a desired thickness.
3) Close the valve from the organic source and introduce argon at about 10 mtorr pressure.
4) Open valve from source of metal (e.g., aluminum) and sputter deposit metal to a desired thickness.
5) Repeat step No. 2.
6) Repeat steps No. 2, 3 and 4 if additional layers are needed to give the desired protection.

Figure 2:
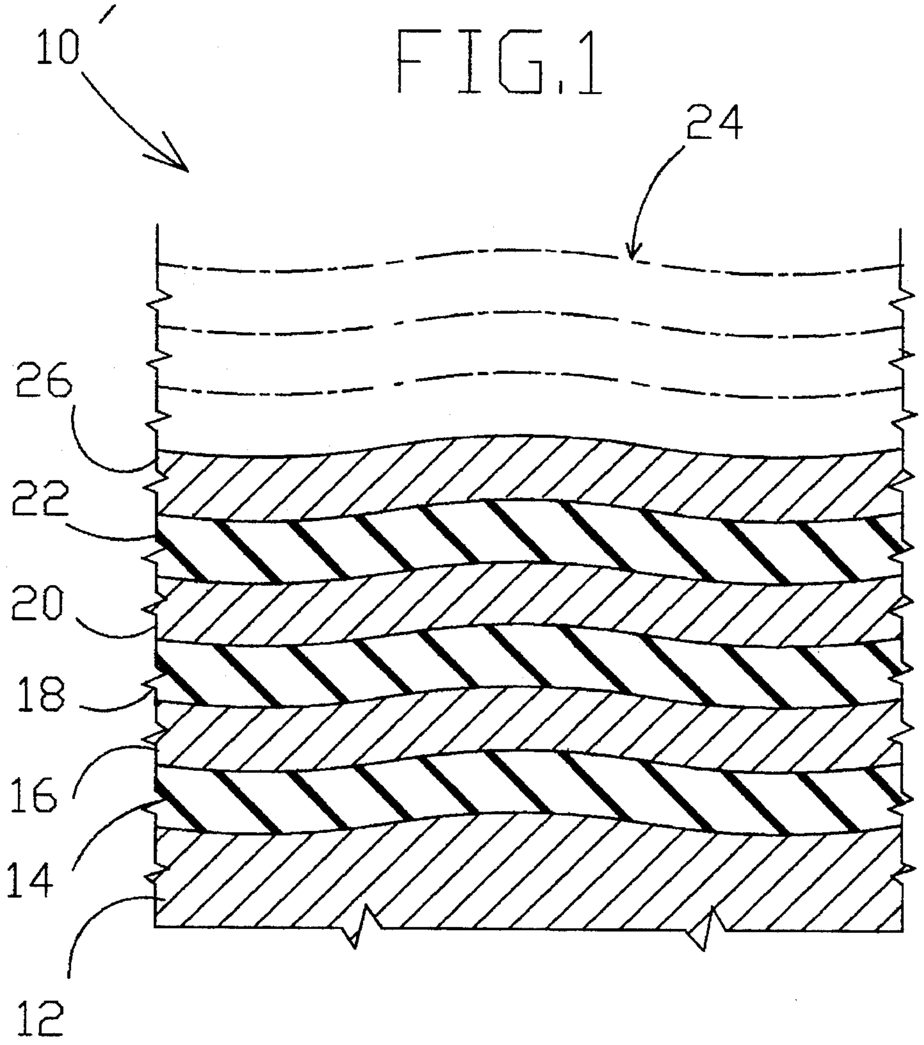
FIG. 2 is an enlarged cross-section of a coating according to another embodiment of the present invention.

Another embodiment of the present invention is illustrated at 10' in FIG. 2. As above, a substrate 12 is first coated with a diffusion barrier layer 14 to give a final layer of resistance to passage of a deleterious substance. This diffusion layer 14, in turn, is completely coated with a physical barrier 16 and then with a second diffusion barrier 18 as described with regard to FIG. 1. One distinction of this embodiment 10' over that of FIG. 1 is that there are at least one additional layer of a physical barrier 20 and a diffusion barrier 22. Of course, there can be additional alternating layers if desired or necessary to provide the degree of protection to the substrate. These additional layers are indicated by the phantom lines 24. All such layers are prepared in the same manner as described above for initial layers 14, 16 and 18. Further, they will have substantially the same thickness as called for above.

Another distinction illustrated in FIG. 2, although it can be applied to the embodiment 10 of FIG. 1, is the introduction of a "getter" layer 26. This is intended to actually react with at least one component of the deleterious substances in the environment to assist in prevention of penetration of the total protective coating. The actual positioning of this getter layer 26 can be chosen based upon the optimum coating fabricating steps. Although shown as a layer separate from the physical and diffusion barriers, the getter layer 26 can be substituted for one or more of the physical barrier layers. Further, it can be positioned anywhere within the many layers of coatings, even closer to the substrate 12 if desired. An example of a getter layer would be the use of zirconium when it is desired to deter the transport of hydrogen through the coating. Other typical getter materials are titanium or lithium films to reduce transport of water or oxygen through the coating. Of course, there can be a plurality of getter layers. For example, there can be a repeating occurrence of three layers: a diffusion barrier layer, a physical barrier layer and a getter layer.

In both FIG. 1 and FIG. 2 a diffusion barrier 14 is shown adjacent the substrate 12 (the object being protected). While this may be the most common structure of the present invention because the organic usually employed provides an electrical insulation when in contact with electrical apparatus. Further, it may be the preferred initial coating for many other objects, particularly since such material will more effectively cover very rough or porous surfaces. However, if the physical barrier (e.g., layer 14) is a ceramic, similar insulating properties would be provided. Thus, it is the particular object to be protected that governs the composition of that first barrier layer.

Although all of the embodiments described above involve separate and distinct layers, the diffusion and physical barrier materials can be a continuum (including also a getter material if desired) coating having any selected variation of constituents throughout. Such a coating can be obtained using, for example, a plasma deposition. Process conditions can be varied to achieve any desired distribution (and concentration) of the constituents.

In order to demonstrate the effectiveness of the present invention, base information was obtained on the weight gain of lithium hydride (LiH) when exposed to elevated moisture and temperature conditions. Specifically, the LiH samples were exposed at 42° C. and 50–58% relative humidity for times up to 800 hours. These conditions were selected to provide accelerated aging of the samples. The weight gain of uncoated LiH and samples coated individually with aluminum and a parylene [a poly(p-xylene) manufactured by Union Carbide under the tradename Parylene-C™] are plotted in FIG. 4 as a function of exposure time. Plot 30 is that for unprotected LiH. It can be seen that the aluminum coating alone (Plot 32) provided essentially no protection against reaction of the moisture with the LiH. The parylene coating alone (Plot 34) provided only moderate protection. In these and the tests reported in FIG. 4, each parylene coating was about 25 micrometers thick, and each aluminum coating was about 30 micrometers thick.

Figure 3:
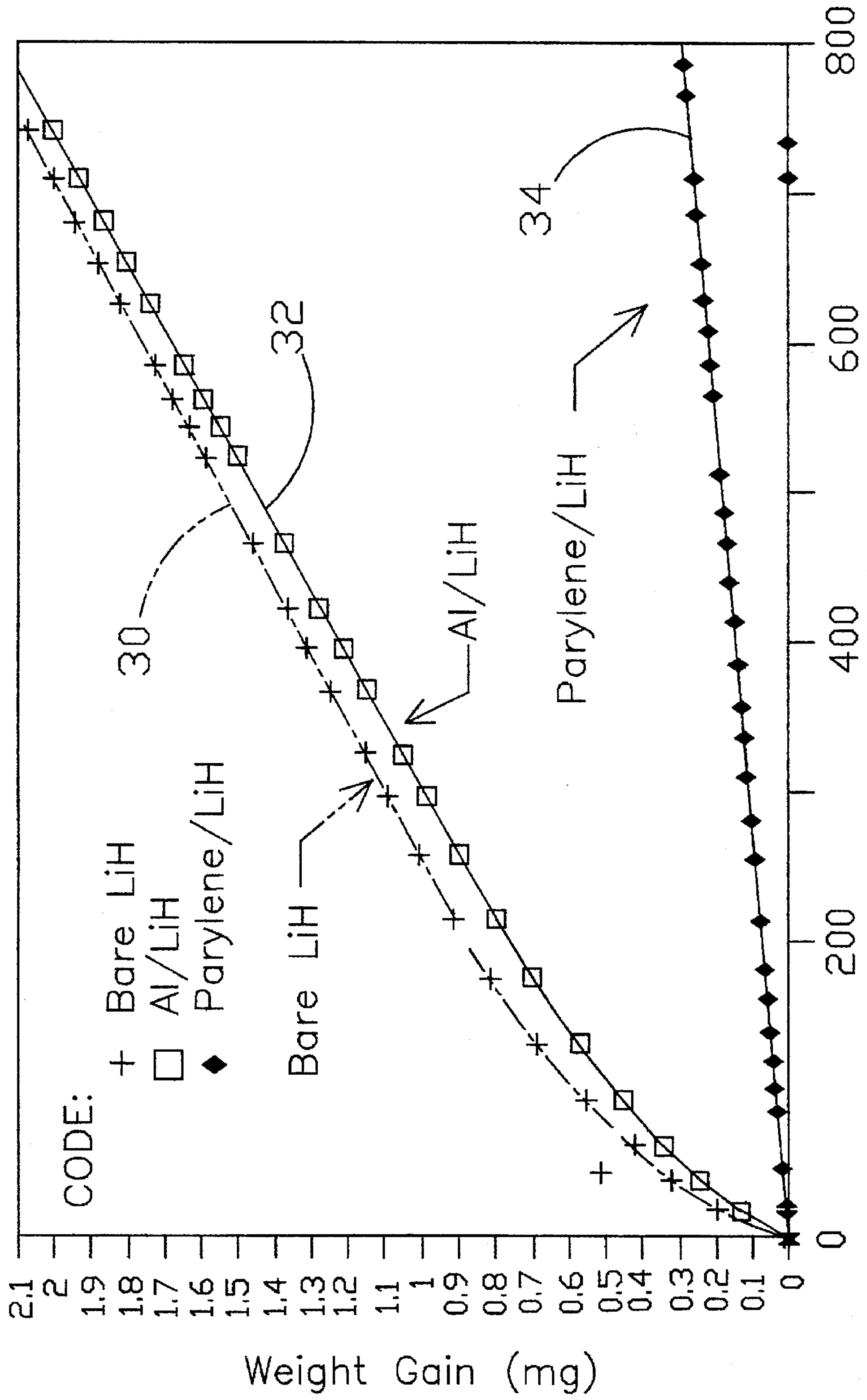
FIG. 3 is a plot of raw data showing the weight gain, as a function of time, of lithium hydride, lithium hydride coated with aluminum, and lithium hydride coated with a parylene.
Figure 4:
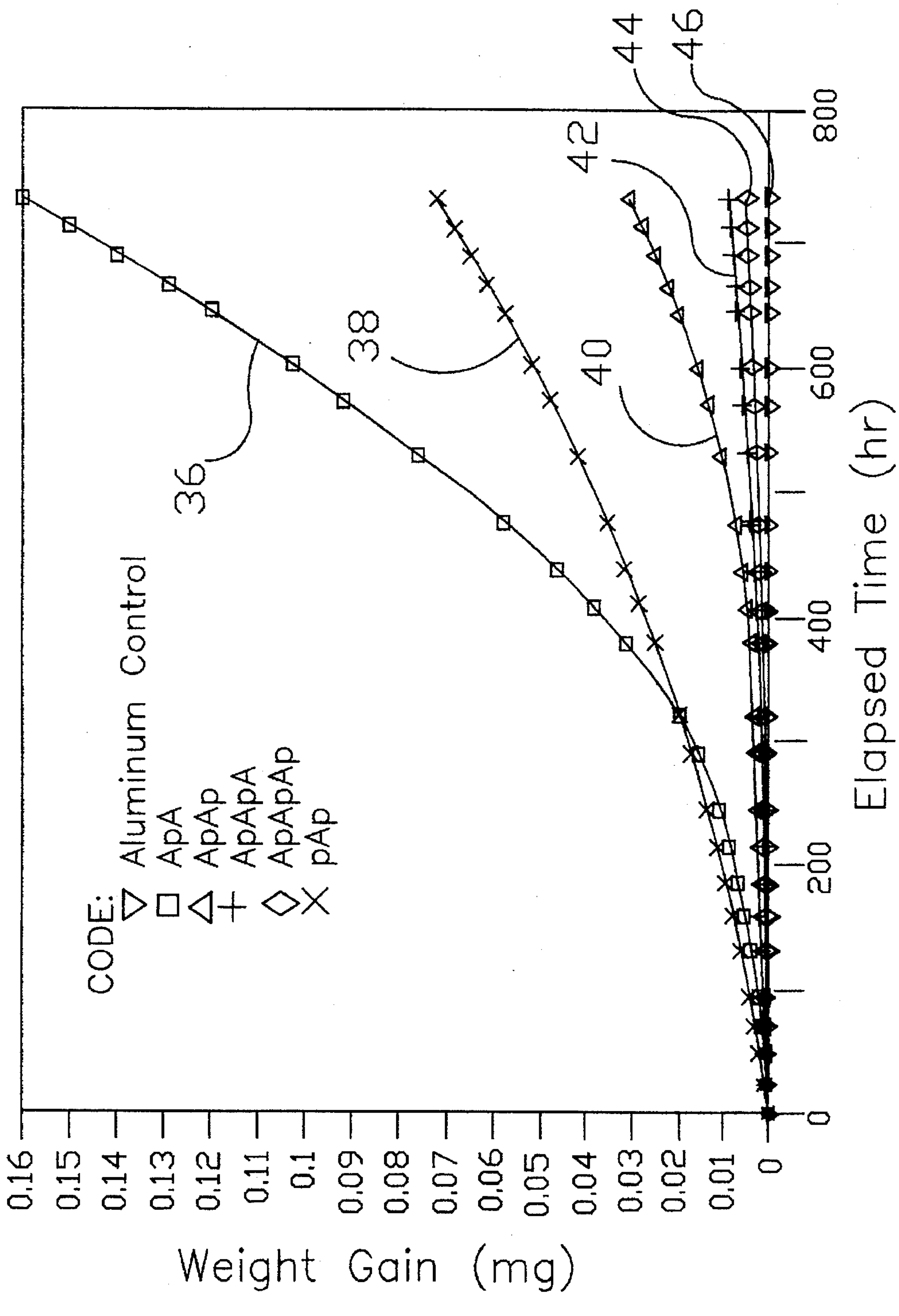
FIG. 4 is a plot of raw data showing the weight gain, as a function of time, of lithium hydride after application of alternating layers of aluminum and a parylene.

Other samples were tested under the same environmental conditions; however, alternating layers of the aluminum and parylene were applied to the samples. The resulting data is plotted in FIG. 4. It will be noted that the units along the Y-axis of this FIG. 4 are greatly magnified compared to those of FIG. 3. In the code indicated in FIG. 4 for the various plots, the parylene layer is designated as p, and the aluminum layer as A. Accordingly, Plot 36 is the data for a sample having two aluminum layers with an intermediate parylene layer. A corresponding three-layer protective coating, but with a single aluminum layer intermediate two parylene layers, resulted in the data in Plot 38. Additional protection was obtained using two coatings each of aluminum and parylene, as illustrated in Plot 40. The data of Plot 42 is for three layers of aluminum with intermediate layers of parylene (a total of five layers), and the data of Plot 44 has three layers each of aluminum and parylene. Plot 46 is for the data of the control sample of aluminum alone.

From the foregoing it will be understood by persons skilled in the art that a protective coating has been developed for use in protecting an object from deleterious constituents existing in the environment surrounding the object. By combining multiple alternating layers of a diffusion barrier with a physical barrier, the protection is greater than the protection given by individual of the layers, and also greater than what would be expected from a simple sum of the protection of the layers. Thus, the protection is synergistic. Although the invention is described as being a coating that is formed in situ, corresponding improvement in protection is provided when a coating pre-assembly (e.g., a shell) is fabricated from the diffusion and physical barrier materials and then utilized to encase the object to be protected. This shell would be formed upon a removable substrate, and then utilized to cover the active substrate—the object to be protected.

While specific examples are given of materials and thicknesses for use with the present invention, these are for illustration only and not for limiting the scope of the invention. Rather, the invention is to be limited only by the appended claims and their equivalents.

I claim:

1. A protective coating for preventing corrosion by deleterious interaction between constituents of an environment and a substrate material placed within that environment, said coating comprising:

a plurality of continuous layers of a diffusion barrier material that is solid in the environment to deter diffusion of the constituents toward the substrate material;

a plurality of continuous layers of a physical barrier material interleaved with said continuous layers of diffusion barrier material to deter transport of the constituents toward the substrate material; and at least one continuous layer of a getter material disposed between one of said plurality of continuous layers of said diffusion barrier material and one of said plurality of continuous layers of said physical barrier material to interact with at least one of the constituents of the environment.

2. The protective coating of claim 1 wherein said physical barrier material is selected from the group consisting of metals and ceramics.

3. The protective coating of claim 2 wherein said physical barrier material is a metal selected from the group consisting of aluminum, gold, silicon and molybdenum.

4. The protective coating of claim 2 wherein said physical barrier material is a ceramic selected from the group consisting of silicon dioxide, silicon carbide, aluminum oxide and magnesium fluoride.

5. The protective coating of claim 1 wherein said diffusion barrier material is selected from the group consisting of polyamides, polyethylenes, poly (p-xylylene)s, fluoropolymers, polyacrylates, silicone polymers, polyurethanes, a carbon exhibiting properties similar to diamond, amorphous carbon and silicon.

6. The protective coating of claim 1 wherein said plurality of continuous layers of said diffusion barrier material and said plurality of continuous layers of said physical barrier material are formed in situ upon the substrate.

7. The protective coating of claim 1 wherein said plurality of continuous layers of said diffusion barrier material and said physical barrier material are preformed for subsequent encapsulation of the substrate.

8. The protective coating of claim 1 wherein each said diffusion barrier layer and said physical barrier layer has a thickness of about 0.5 to about 100 micrometers.

9. The protective coating of claim 1 further comprising a plurality of continuous layers of a getter material interleaved between said plurality of continuous layers of said diffusion barrier material and said plurality of continuous layers of said physical barrier material.

10. The protective coating of claim 1 wherein said diffusion barrier material is a poly(p-xylylene) and said physical barrier material is aluminum.

11. A protective coating for preventing corrosion by deleterious interaction between constituents of an environment and a substrate material placed within that environment, said coating comprising;

a plurality of continuous layers of a diffusion barrier material that is solid in the environment to deter diffusion of the constituents toward the substrate material;

a plurality of continuous layers of a physical barrier material to deter transport of the constituents toward the substrate material, said physical barrier material being a ceramics selected from the group consisting of silicon dioxide, silicon carbide, aluminum oxide and magnesium fluoride.

12. The protective coating of claim 11 wherein each said diffusion barrier layer and each said physical barrier layer has a thickness from about 0.5 to about 100 micrometers.

13. The protective coating of claim 11 wherein said plurality of continuous layers of said diffusion barrier material and said physical barrier material are formed in situ upon the substrate.

14. The protective coating of claim 11 wherein said plurality of continuous layers of said diffusion barrier material and said physical barrier material are preformed for subsequent encapsulation of the substrate.

15. The protective coating of claim 11 wherein said diffusion barrier material is selected from the group consisting of polyamides, polyethylenes, poly (p-xylylenes)s, fluropolymers, polyacylates, silicon polymers, polyurethanes, a carbon exhibiting properties similar to diamond, amorphous carbon and silicon.

16. The protective coating of claim 15 wherein said diffusion barrier material is a poly(p-xylylene).

* * * * *